US007513041B2

(12) United States Patent
Ito et al.

(10) Patent No.: US 7,513,041 B2
(45) Date of Patent: Apr. 7, 2009

(54) METHOD FOR PRODUCING A NOZZLE PLATE

(75) Inventors: Atsushi Ito, Owariasahi (JP); Yasuo Okawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 261 days.

(21) Appl. No.: 10/953,434

(22) Filed: Sep. 30, 2004

(65) Prior Publication Data

US 2005/0110835 A1 May 26, 2005

(30) Foreign Application Priority Data

Sep. 30, 2003 (JP) ............................ 2003-341408

(51) Int. Cl.
*B23P 17/00* (2006.01)
*B41J 2/14* (2006.01)

(52) U.S. Cl. .......................... 29/890.1; 29/412; 29/417; 29/424; 29/432; 437/47

(58) Field of Classification Search ................ 29/890.1, 29/417, 412, 432, 424; 347/68, 92, 140, 347/47; 72/379.2, 356, 325, 358, 377, 359; 216/27
See application file for complete search history.

(56) References Cited

U.S. PATENT DOCUMENTS 4,282,533 A 8/1981 Brooks et al.
4,460,527 A * 7/1984 Kato ........................ 156/89.27
4,544,327 A * 10/1985 Kato ........................ 416/241 B
4,574,445 A * 3/1986 Bentin et al. ............... 29/890.1
4,696,777 A * 9/1987 Ito ............................ 264/642
4,701,106 A * 10/1987 Sasaki ..................... 416/241 B
5,595,785 A * 1/1997 Hindagolla et al. ......... 430/320
5,642,641 A * 7/1997 Maxfield, Jr. et al. ......... 72/358
6,170,934 B1 * 1/2001 Fujisawa et al. .............. 347/47
6,179,978 B1 * 1/2001 Hirsh et al. ................. 204/281
2003/0122900 A1 7/2003 Nakamura et al.

FOREIGN PATENT DOCUMENTS

| | | | |
|---|---|---|---|
| CN | 1079328 C | | 2/2002 |
| EP | 0 858 893 A2 | | 8/1998 |
| JP | A-05-229127 | | 9/1993 |
| JP | 07-060971 | * | 7/1995 |
| JP | A-10-226070 | | 8/1998 |
| JP | A-2000-289211 | | 10/2000 |
| JP | A-2001-010054 | | 1/2001 |
| JP | A-2003-25590 | | 1/2003 |

* cited by examiner

*Primary Examiner*—David P Bryant
*Assistant Examiner*—Tai Nguyen
(74) *Attorney, Agent, or Firm*—Oliff & Berridge, PLC

(57) ABSTRACT

A nozzle plate includes a nozzle surface and a nozzle hole. The nozzle surface defines an ink ejection port. The nozzle hole includes a taper hole portion and a curved-surface hole portion. The taper hole portion has an inner surface of a truncated conical shape and has the smallest diameter at one end thereof. The curved-surface hole portion has an inner surface of a curved-surface shape. The inner diameter of the curved-surface hole portion gradually decreases as approaching from the one end of the taper hole portion to the ink ejection port.

13 Claims, 16 Drawing Sheets

| B/A | 5.0 | 5.5 | 6.0 | 6.5 | 7.0 | 7.5 | 8.0 | 8.5 | 9.0 | 9.5 | 10.0 | 10.5 | 11.0 | 11.5 | 12.0 |
|---|---|---|---|---|---|---|---|---|---|---|---|---|---|---|---|
| 5.0 | | | | | | | | | | | | | | | |
| 5.5 | | | | | | | | | | | | | | | |
| 6.0 | | | | | | | | | | | | | | | |
| 6.5 | | | | | | | | | | | | | | | |
| 7.0 | | | | | | | | | | | | | | | |
| 7.5 | | | | | | | | | | | | | | | |
| 8.0 | | | | | | | | | | | | | | | |
| 8.5 | | | | | | | | | | | | | | | |
| 9.0 | | | | | | | | | | | | | | | |
| 9.5 | | | | | | | | | | | | | | | |
| 10.0 | | | | | | | | | | | | | | | |
| 10.5 | | | | | | | | | | | | | | | |
| 11.0 | | | | | | | | | | | | | | | |
| 11.5 | | | | | | | | | | | | | | | |
| 12.0 | | | | | | | | | | | | | | | |

| B/A | 5.0 | 5.5 | 6.0 | 6.5 | 7.0 | 7.5 | 8.0 | 8.5 | 9.0 | 9.5 | 10.0 | 10.5 | 11.0 | 11.5 | 12.0 |
|---|---|---|---|---|---|---|---|---|---|---|---|---|---|---|---|
| 5.0 | | | | | | | | | | | | | | | |
| 5.5 | | | | | | | | | | | | | | | |
| 6.0 | | | | | | | | | | | | | | | |
| 6.5 | | | | | | | | | | | | | | | |
| 7.0 | | | | | | | | | | | | | | | |
| 7.5 | | | | | | | | | | | | | | | |
| 8.0 | | | | | | | | | | | | | | | |
| 8.5 | | | | | | | | | | | | | | | |
| 9.0 | | | | | | | | | | | | | | | |
| 9.5 | | | | | | | | | | | | | | | |
| 10.0 | | | | | | | | | | | | | | | |
| 10.5 | | | | | | | | | | | | | | | |
| 11.0 | | | | | | | | | | | | | | | |
| 11.5 | | | | | | | | | | | | | | | |
| 12.0 | | | | | | | | | | | | | | | |

FIG. 12A

| B/A | 5.0 | 5.5 | 6.0 | 6.5 | 7.0 | 7.5 | 8.0 | 8.5 | 9.0 | 9.5 | 10.0 | 10.5 | 11.0 | 11.5 | 12.0 |
|---|---|---|---|---|---|---|---|---|---|---|---|---|---|---|---|
| 5.0 | | | | | | | | | | | | | | | |
| 5.5 | | | | | | | | | | | | | | | |
| 6.0 | | | | | | | | | | | | | | | |
| 6.5 | | | | | | | | | | | | | | | |
| 7.0 | | | | | | | | | | | | | | | |
| 7.5 | | | | | | | | | | | | | | | |
| 8.0 | | | | | | | | | | | | | | | |
| 8.5 | | | | | | | | | | | | | | | |
| 9.0 | | | | | | | | | | | | | | | |
| 9.5 | | | | | | | | | | | | | | | |
| 10.0 | | | | | | | | | | | | | | | |
| 10.5 | | | | | | | | | | | | | | | |
| 11.0 | | | | | | | | | | | | | | | |
| 11.5 | | | | | | | | | | | | | | | |
| 12.0 | | | | | | | | | | | | | | | |

FIG. 12B

| B/A | 5.0 | 5.5 | 6.0 | 6.5 | 7.0 | 7.5 | 8.0 | 8.5 | 9.0 | 9.5 | 10.0 | 10.5 | 11.0 | 11.5 | 12.0 |
|---|---|---|---|---|---|---|---|---|---|---|---|---|---|---|---|
| 5.0 | | | | | | | | | | | | | | | |
| 5.5 | | | | | | | | | | | | | | | |
| 6.0 | | | | | | | | | | | | | | | |
| 6.5 | | | | | | | | | | | | | | | |
| 7.0 | | | | | | | | | | | | | | | |
| 7.5 | | | | | | | | | | | | | | | |
| 8.0 | | | | | | | | | | | | | | | |
| 8.5 | | | | | | | | | | | | | | | |
| 9.0 | | | | | | | | | | | | | | | |
| 9.5 | | | | | | | | | | | | | | | |
| 10.0 | | | | | | | | | | | | | | | |
| 10.5 | | | | | | | | | | | | | | | |
| 11.0 | | | | | | | | | | | | | | | |
| 11.5 | | | | | | | | | | | | | | | |
| 12.0 | | | | | | | | | | | | | | | |

METHOD FOR PRODUCING A NOZZLE PLATE

BACKGROUND OF THE INVENTION

1. Field of the Invention

The present invention relates to a method of producing a nozzle plate including nozzle holes for ejecting an ink, and also to such a nozzle plate.

2. Description of the Related Art

An ink jet head includes a nozzle plate having many nozzle holes, and is configured so that an ink is ejected from the many nozzle holes onto a recording medium. An example of such a nozzle plate is a nozzle plate 100 in which, as shown in FIG. 16, a nozzle hole 102 having an inner face of a tapered shape is formed in a substrate 101 made of polyimide or the like by excimer laser processing or another method.

In another nozzle plate 110, as shown in FIG. 17, a nozzle hole 112 is formed in a metal substrate 111 by press working using a punch or the like. The nozzle hole is formed of: a tapered hole portion 112*a* which is continuous to an ink flow path on an upstream side, and which has a truncated conical shape; and a columnar hole portion 112*b* which elongates from the smallest diameter end portion of the tapered hole portion 112*a* to an ink ejection port 113 in the surface of the substrate 111. However, in the nozzle hole 112, the rate of change of the inner diameter is very large in a portion where the tapered hole portion 112*a* is connected to the columnar hole portion 112*b*, thereby causing the possibility that the property of ink ejection from the ink ejection port 113 (particularly, the ink impact accuracy) is adversely affected. Therefore, a nozzle plate 120 shown in FIG. 18 has been proposed in which a nozzle hole 122 having: a tapered hole portion 122*a;* a columnar hole portion 122*b*; and a curved-surface hole portion 122*c* that smoothly interconnects the tapered hole portion 122*a* and the columnar hole portion 122*b* and that has an arcuate section shape is formed in a substrate 121 (for example, see U.S. Pat. No. 6,170,934 (columns 6 and 7; and FIGS. 3A and 3B)).

In the case where nozzle holes are formed in a substrate by excimer laser processing, press working, or another method, it is usual to remove the surface of the substrate by polishing or the like in order to eliminate burrs and swelling formed in the surface of the substrate.

SUMMARY OF THE INVENTION

In the nozzle plate 100 of FIG. 16, the inner face of the nozzle hole 102 is formed into a tapered shape. Therefore, the rate of change of the inner diameter is constant, or not abruptly changed, so that the impact performance of an ink ejected from an ink ejection hole 103 in the surface of the substrate is satisfactory. However, when the nozzle hole 102 having a tapered shape is formed in the substrate 101 and the surface portion of the substrate 101 is then removed away by polishing or the like, the removal amount (the removed thickness) of the surface portion may be varied due to a working error or the like. In this case, the diameter of the ink ejection hole 103 is largely varied because the inner face of the nozzle hole 102 has a tapered shape. Also, in order to conduct laser processing, the material of the nozzle plate 100 is restricted to a synthetic resin such as polyimide. Such a synthetic resin has a large coefficient of linear expansion, and hence there arises a problem in that, when the substrate is heated during a production process, positional displacement is caused by thermal expansion.

By contrast, in the nozzle plate 110 of FIG. 17 and the nozzle plate 120 (see FIG. 18) which is an improvement of the nozzle plate 110 and is disclosed in U.S. Pat. No. 6,170,934, the columnar hole portion in which the inner diameter is not changed is formed on the side of the surface of the substrate. When the substrate surface is removed away by polishing or the like, the diameter of the ink ejection port in the substrate surface is not therefore affected by the removal amount of the substrate, so that the diameter of the ink ejection hole is not varied. In the nozzle hole in FIG. 17, however, the inner diameter is largely changed in the portion where the tapered hole portion 112*a* is connected to the columnar hole portion, 112*b*. In the nozzle hole 122 in FIG. 18, the curved-surface hole portion 122*c* functions simply to smoothly interconnect the tapered hole portion 122*a* and the columnar hole portion 122*b*. Hence, the rate of change of the inner diameter across the connection end between the curved-surface hole portion 122*c* and the tapered hole portion 122*a* and the connection end between the curved-surface hole portion 122*c* and the columnar hole portion 122*b* is very sharp. As a result, the inner diameter is largely changed.

Particularly, in a state immediately before ink is ejected from a nozzle, a meniscus is formed by the surface tension of an ink in a position which is slightly inner than the ink ejection port of the substrate surface. When a meniscus is formed in the vicinity of the connection end between the curved-surface hole portion 122*c* and the columnar hole portion 122*b*, however, the formed meniscus is unstable because the inner diameter is largely changed in the position where the meniscus is formed, with the result that the impact accuracy of the ink ejected from the ink ejection port is considerably lowered.

In view of the above circumstances, the intention provides a nozzle plate including a nozzle hole an inner diameter of which changes moderately to improve the ink impact accuracy.

According to one embodiment of the invention, a method for producing a nozzle plate, includes: pressing a substrate with using a metal mold part that includes a taper portion having a truncated-cone shape, a truncated conical portion, and a curved-surface portion connecting the taper portion and the truncated conical portion, to form the substrate with a taper hole portion, a truncated conical hole portion, and a curved-surface hole portion connecting the taper hole portion and the truncated conical hole portion, which correspond to the taper portion, the truncated conical portion, and the curved-surface portion, respectively; and removing at least the truncated conical hole portion from the substrate.

In the method of producing a nozzle plate, first, the substrate is pressed with using the metal mold part that includes the taper portion having a truncated-cone shape, a truncated conical portion; and a curved-surface portion connecting the taper portion and the truncated conical portion, to form the substrate with the taper hole portion, the truncated conical hole portion, and the curved-surface hole portion connecting the taper hole portion and the truncated conical hole portion. Next, in order to eliminate burrs and swelling formed on the surface of the substrate as a result of the press working, the surface of the substrate is removed away by polishing or the like. When the surface portion where the columnar hole portion is formed is removed away, also the connection end between the curved-surface hole portion to the columnar hole portion is removed away. Therefore, the inner diameter of a nozzle hole is gently changed as advancing from an ink ejection port in the substrate surface to the curved-surface hole portion having an arcuate section shape, so that the ink impact accuracy is improved. In the removing of the surface portion, it is requested to remove away the whole columnar hole portion including at least the connection end. The removing may include the case where also a part of the curved-surface hole portion is removed away together with the whole columnar hole portion.

Also, it is noted that the truncated conical shape contain a columnar shape.

According to one embodiment of the invention, a nozzle plate includes a nozzle surface defining an ink ejection port; and a nozzle hole. The nozzle hole includes a taper hole portion and a curved-surface hole portion. The taper hole portion has an inner surface of a truncated conical shape and has the smallest diameter at one end thereof. The curved-surface hole portion has an inner surface of a curved-surface shape an inner diameter of which gradually decreases as approaching from the one end of the taper hole portion to the ink ejection port. Since the inner diameter of the nozzle hole does not change abruptly among the taper hole portion and the curved-surface hole portion, the impact accuracy of ink ejected from the ink ejection port can be improved.

BRIEF DESCRIPTION OF THE DRAWINGS

FIG. 12A is a view showing results of a study of the ink impact accuracy (in a conventional nozzle plate) in the case where the ink is black, and FIG. 12B is a view showing results in the case where the ink is cyan.

DETAILED DESCRIPTION OF THE PREFERRED EMBODIMENT

An embodiment of the invention will be described with reference to the accompanying drawings. In the embodiment, the invention is applied to a nozzle plate for an ink jet head which ejects ink onto a sheet.

Figure 1:
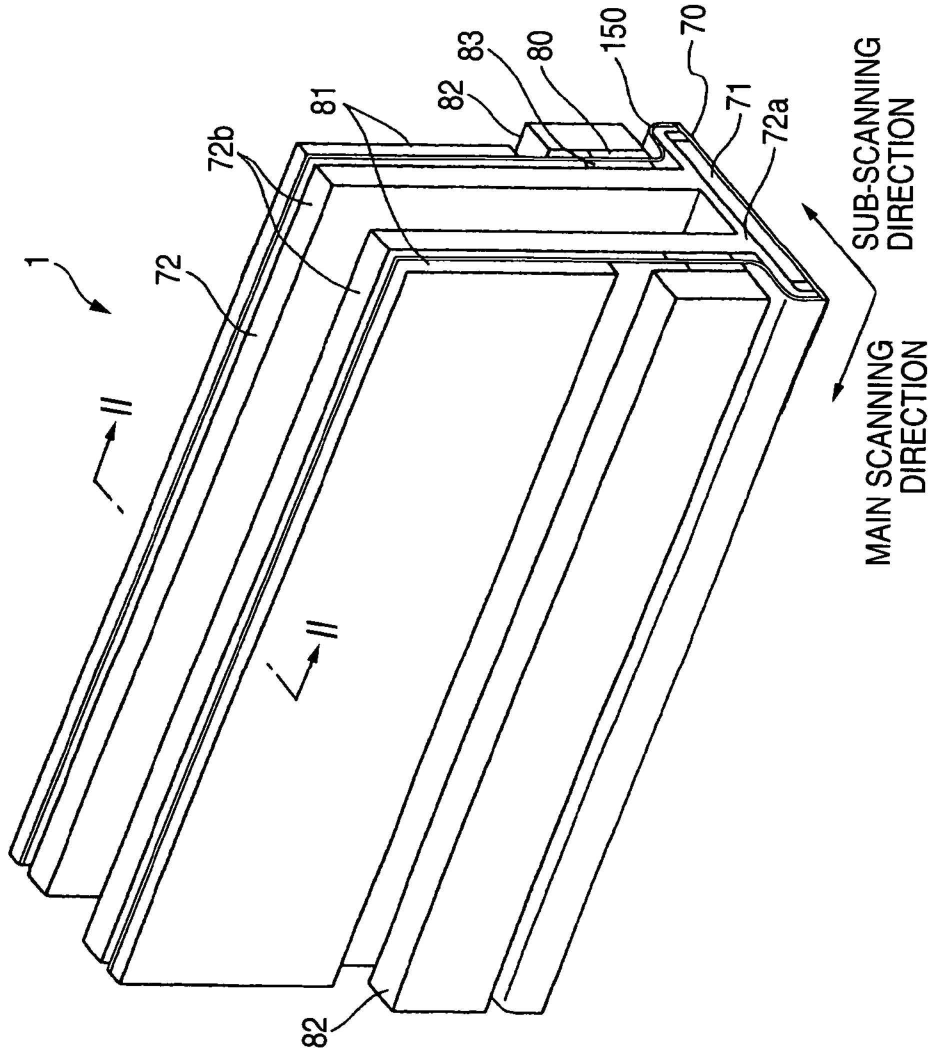
FIG. 1 is a perspective view of an ink jet head of an embodiment of the invention.
Figure 2:
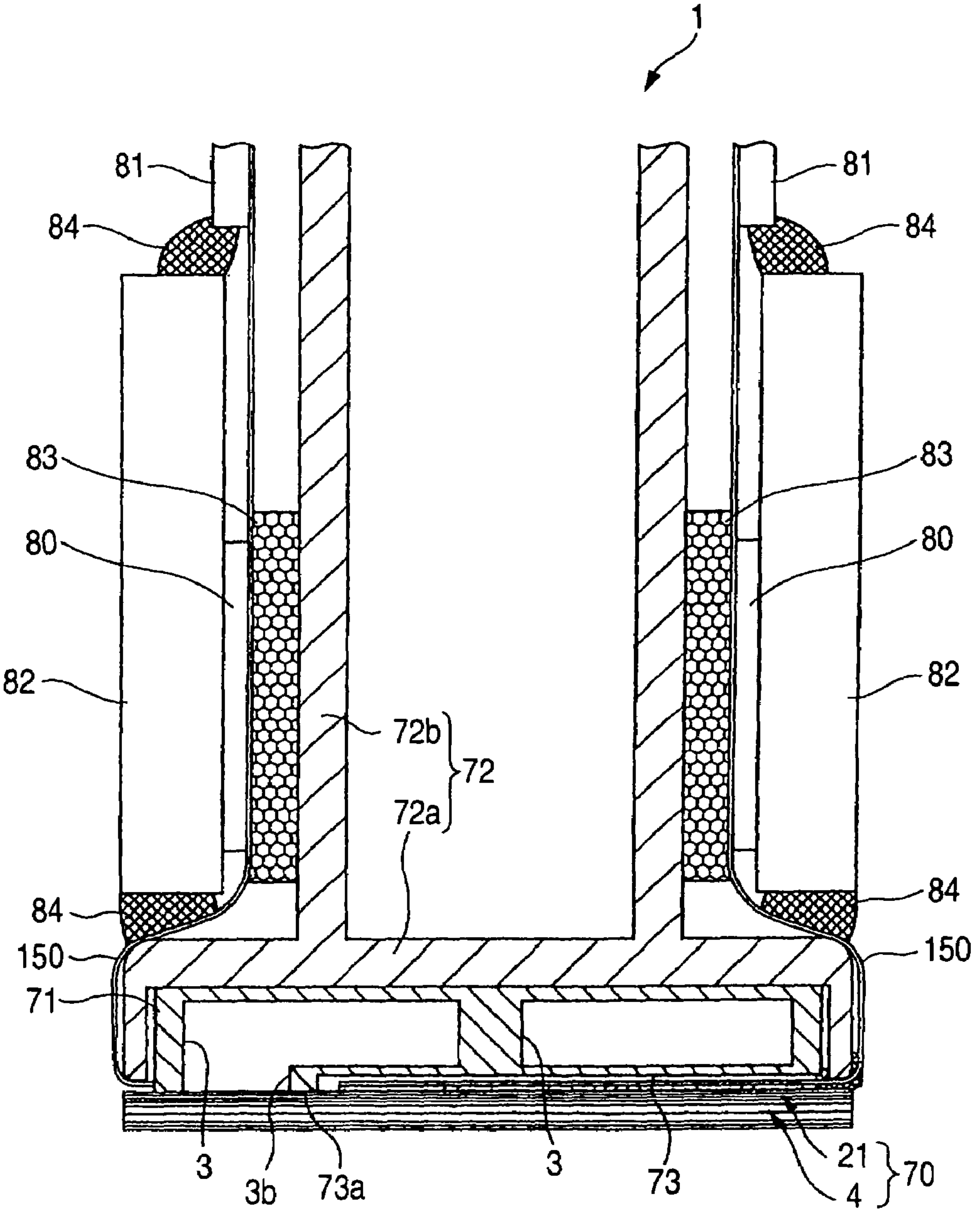
FIG. 2 is a section view taken along the line II-II in FIG. 1.

First, the ink jet head will be described. As shown in FIGS. 1 and 2, the ink jet head 1 in the embodiment includes: a head body 70 having a rectangular planar shape extending in the in a main scanning direction along which an ink is ejected to a sheet; and a base block 71 which is placed above the head body 70, and in which two ink reservoirs 3 serving as flow paths of an ink to be supplied to the head body 70 are formed.

The head body 70 includes: a flow path unit 4 in which ink flow paths are formed; and a plurality of actuator units 21 which are bonded to the upper face of the flow path unit 4. The flow path unit 4 and the actuator units 21 are configured by laminating and bonding plural thin plates together. Flexible printed circuits (FPCs) 150 which function as power supply members are bonded to the upper faces of the actuator units 21, and led out to the lateral sides. The base block 71 is made of a metal material such as stainless steel. The ink reservoirs 3 in the base block 71 are hollow regions, which are formed in the longitudinal direction of the base block 71 and have a substantially rectangular parallelepiped shape.

The lower face 73 of the base block 71 downward protrudes from the periphery in the vicinity of an opening 3*b*. The base block 71 is in contact with the flow path unit 4, only in the proximate portion 73*a* of the opening 3*b* of the lower face 73. Therefore, the region of the base block 71 other than the proximate portion 73*a* of the opening 3*b* of the lower face 73 is separated from the head body 70. The actuator units 21 are placed in such a separated region.

The base block 71 is bonded and fixed into a recess which is formed in the lower face of a holding portion 72*a* of a holder 72. The holder 72 includes the holding portion 72*a* and a pair of planar projections 72*b,* which extend from the upper face of the holding portion 72*a* in a direction perpendicular to the upper face with forming a predetermined gap therebetween. The FPCs 150 bonded to the actuator units 21 are placed so as to extend along the surfaces of the projections 72*b* of the holder 72 via elastic members 83 such as sponges, respectively. Driver ICs 80 are disposed on the FPCs 150 placed on the surfaces of the projections 72*b* of the holder 72. The FPCs 150 are electrically connected by soldering to the driver ICs 80 and the actuator units 21 of the head body 70 so as to transmit driving signals output from the driver ICs 80 to the actuator units 21, respectively.

Heat sinks 82 having a substantially rectangular parallelepiped shape are closely contacted with the outer surfaces of the driver ICs 80, so that heat generated by the driver ICs 80 can be efficiently dissipated. Substrates 81 are placed above the driver ICs 80 and the heat sinks 82, and outside the FPCs 150. The upper faces of the heat sinks 82 and the substrates 81, and the lower faces of the heat sinks 82 and the FPCs 150 are bonded together by seal members 84, respectively.

Figure 3:
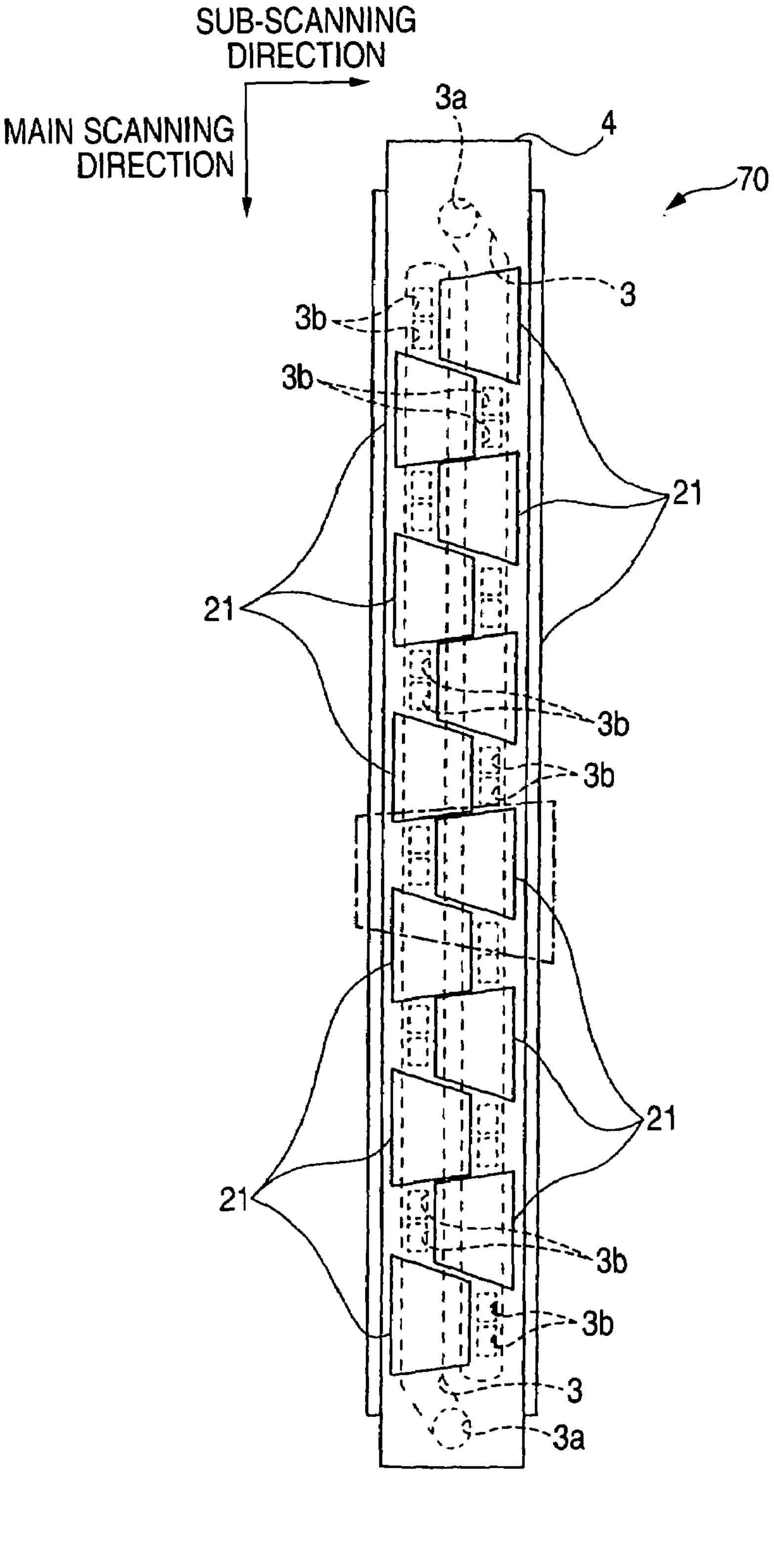
FIG. 3 is a plan view of a head body.

FIG. 3 is a plan view of, the head body 70 shown in FIG. 1. In FIG. 3, the ink reservoirs 3 formed in the base block 71 are virtually indicated by broken lines. The two ink reservoirs 3 elongate parallel to each other in the longitudinal direction of the head body 70 with forming a predetermined gap therebetween. Each of the two ink reservoirs 3 has an opening 3*a* in one end, and communicates with an ink tank (not shown)

through the opening 3*a* so as to be always filled with an ink. Many openings 3*b* are disposed in each of the ink reservoirs 3 so as to be arranged in the longitudinal direction of the head body 70, thereby connecting the ink reservoir 3 to the flow path unit 4 as described above. Paired two ones of the openings 3*b* are juxtaposed in the longitudinal direction of the& head body 70. The pairs of the openings 3*b* communicating with one of the ink reservoirs 3, and those of the openings 3*b* communicating with the other ink reservoir 3 are arranged in a staggered pattern.

The actuator units 21 which have a trapezoidal shape in a plan view are placed in a region where the openings 3*b* are not placed. Specifically, one pair of the openings 3*b*, and one actuator unit 21 are juxtaposed in the transverse direction (sub-scanning direction) of the flow path unit 4, so that the plural actuator units 21 are arranged in a staggered pattern in the longitudinal direction (scanning direction) of the flow path unit 4. In each of the actuator units 21, the parallel opposed edges (upper and lower edges) are parallel to the longitudinal direction of the head body 70 oblique lines of the adjacent actuator units 21 partly overlap with each other in the width direction of the head body 70.

Figure 4:
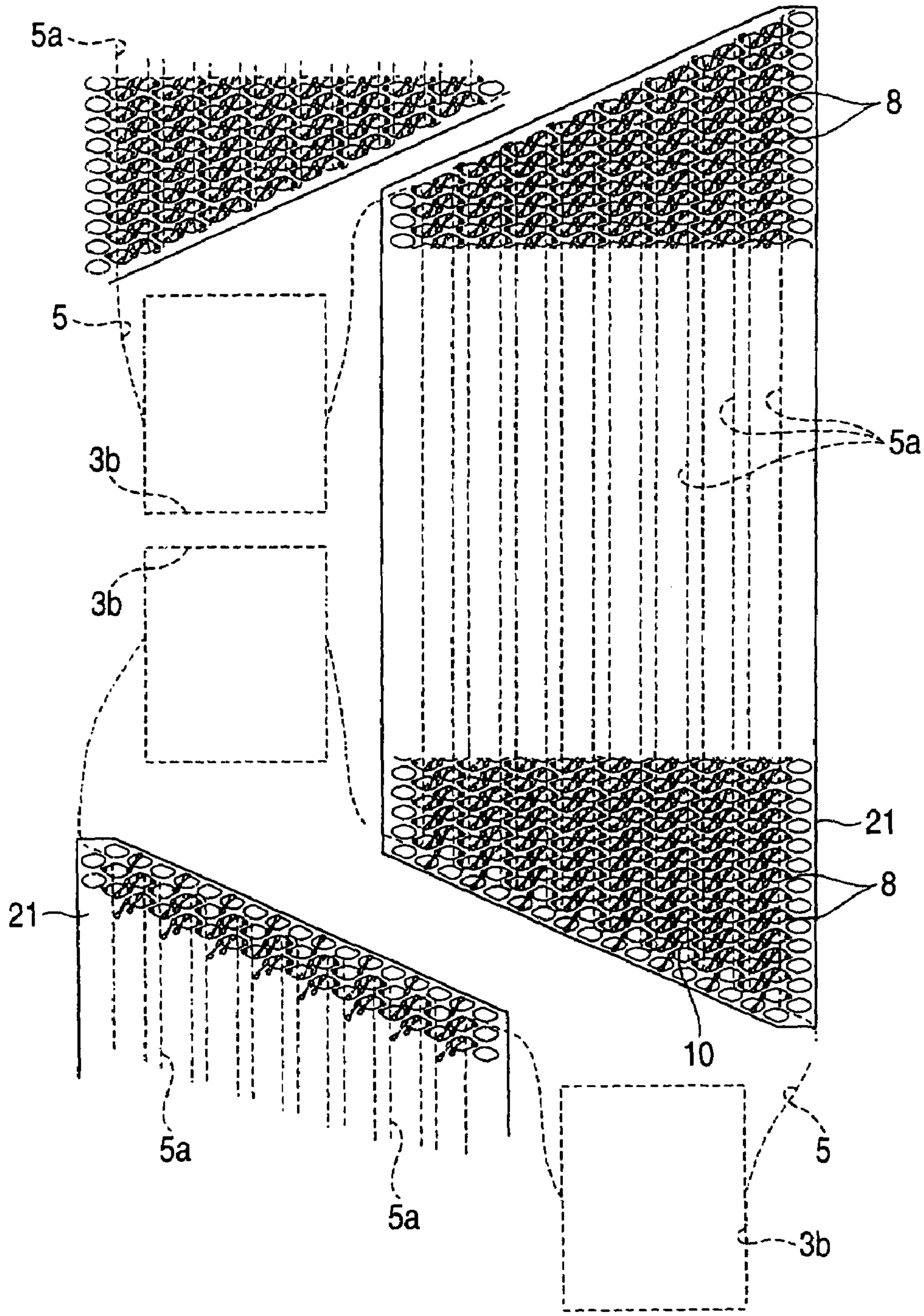
FIG. 4 is an enlarged view of a region enclosed by the one-dot chain line in FIG. 3.

FIG. 4 is an enlarged view of a region enclosed by the one-dot chain line in FIG. 3. As shown in FIG. 4, the opening 3*b* disposed in each of the ink reservoirs 3 communicates with a manifold 5. The tip end portion of each manifold 5 branches into sub-manifolds 5*a* serving as common ink paths. Therefore, a total of eight sub-manifolds 5*a*, which are separated from one another, elongate along the parallel opposed edges of the actuator unit 21 below the actuator unit 21. The lower face of the flow path unit 4 corresponding to the bonding region of the actuator unit 21 is an ink ejection region. Many nozzle holes 8 and pressure chambers 10 are arranged in a matrix form in the surface of ink ejection region.

Figure 5:
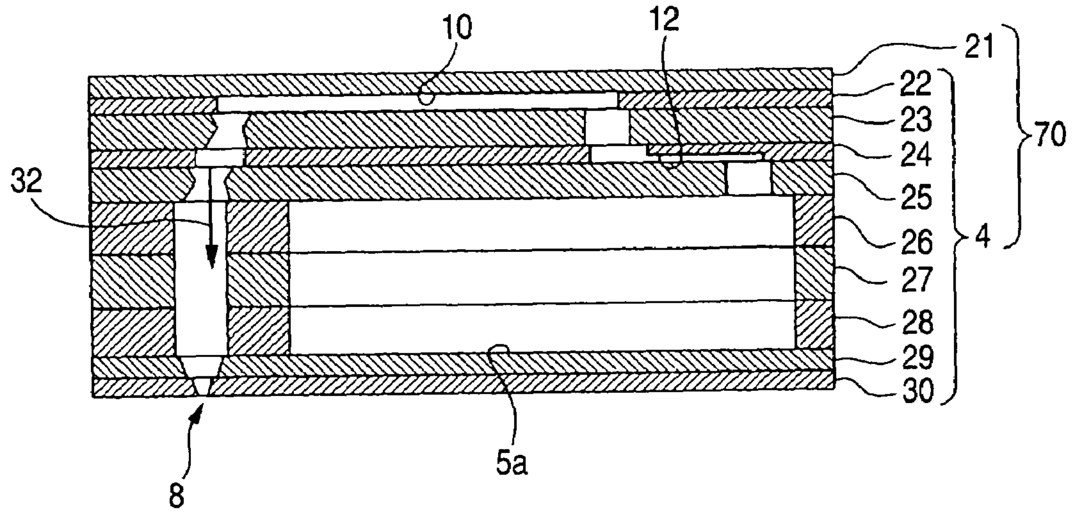
FIG. 5 is a section view of the head body 70 for one pressure chamber shown in FIG. 4.

FIG. 5 is a section view of the head body 70 for one pressure chamber 10 shown in FIG. 4. The head body 70 has a laminated structure in which ten sheet members, that is, the actuator unit 21, a cavity plate 22, a base plate 23, an aperture plate 24, a supply plate 25, manifold plates 26, 27, 28, a cover plate 29, and a nozzle plate 30 are laminated. The flow path unit 4 is configured of nine plates excluding the actuator unit 21. An individual ink flow path 32 which elongates from the sub-manifold 5*a* to the nozzle hole 8 through an aperture 12 and the pressure chamber 10 is formed in the flow path unit 4.

Figure 6:
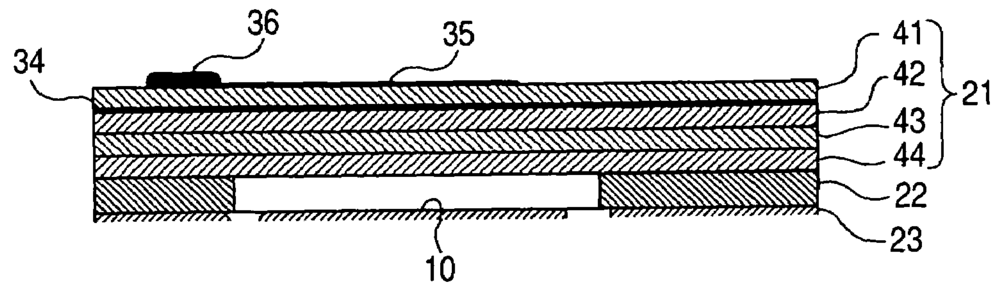
FIG. 6 is a plan view of an actuator unit.

As shown in FIG. 6, the actuator unit 21 includes four piezoelectric sheets 41 to 44; plural individual electrodes 35, which are disposed respectively for the pressure chambers 10; and a common electrode 34, which is maintained to the ground potential. When an ink is to be ejected from the nozzle hole 8, a signal is sent from the driver ICs 80 to a contact portion 36 of the individual electrode 35 to produce a potential difference between the individual electrode 35 and the common electrode 34. Then, the piezoelectric sheets 41 to 44 are deformed so as to protrude toward the pressure chamber 10, whereby the capacity of the pressure chamber 10 is reduced to raise the pressure in the pressure chamber 10. As a result, an ink is ejected from the nozzle hole B.

As the material of the nozzle plate 30 in which the many nozzle holes 8 are formed, various materials which have been conventionally widely used, such as polyimide are useful. In the case where the head body 70 elongates in the main scanning direction in order to realize an increased printing speed like the ink jet head 1 of the embodiment, when the nozzle plate 30 elongating in the main scanning direction is made of polyimide having a large coefficient of thermal expansion, there arises the following possibility. That is, thermal expansion causes considerably large dimensional error due to the temperature at which the nozzle plate 30 is bonded to the cover plate 29. In the embodiment, therefore, the nozzle plate 30, which is made of a metal (for example, stainless steel such as SUS403) having a smaller coefficient of linear expansion than that of polyimide, is used.

Next, a method of producing the nozzle plate 30 will be described. In the method of producing the nozzle plate 30, a metal substrate 50 is punched with a punch 51 (die part) to form the nozzle hole 8 in the substrate 50 as described later.

Figure 7:
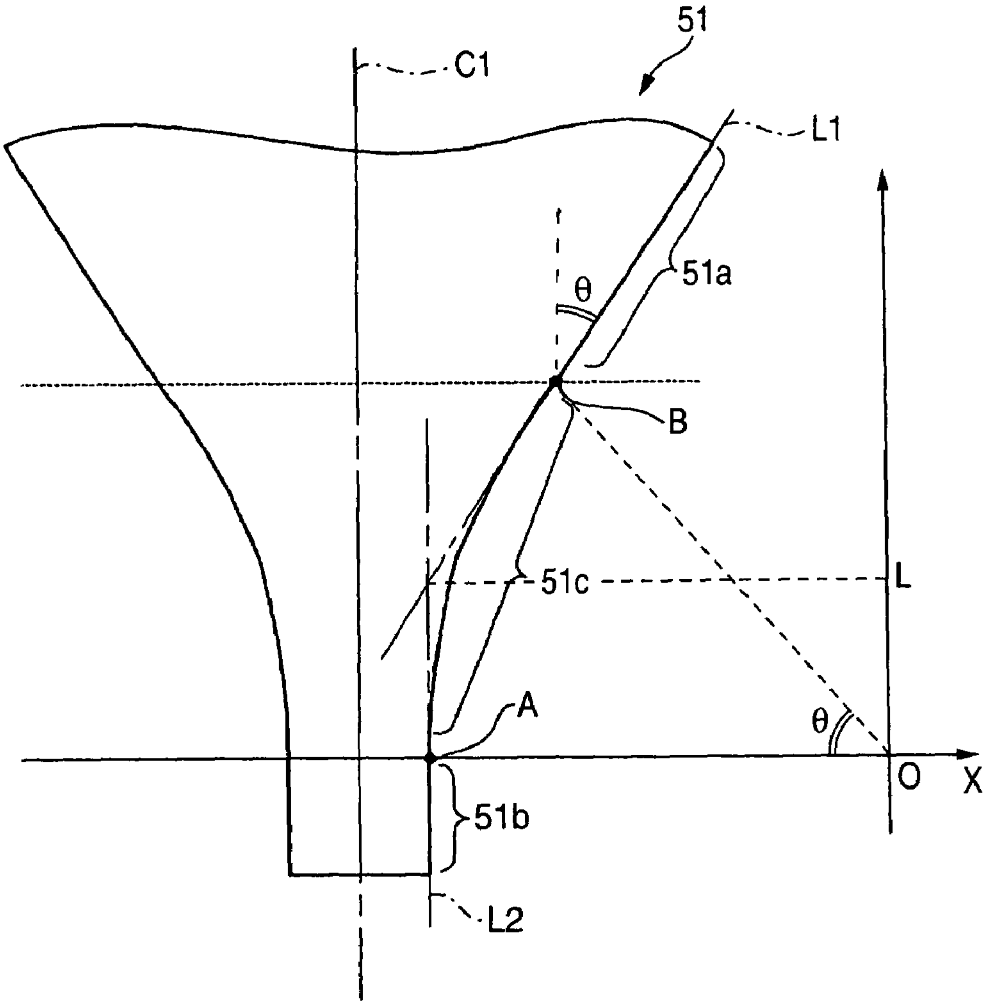
FIG. 7 is an enlarged view of a tip end portion of a punch.

As shown in FIG. 7, the punch 51 has: a tapered portion 51*a*, which is formed on the basal side and has a truncated conical shape; a columnar portion 51*b*, which is on the tip end side; and a curved surface portion 51*c*, which interconnects the tapered portion 51*a* and the columnar portion 51*b*. In a section containing the axis C1 of the punch 51, the curved surface portion 51*c* includes an arc in which tangential lines L1, L2 at connection ends B, A between the curved surface portion 51*c* and the tapered portion 51*a*, the columnar portion 51*b* are parallel to straight lines forming the tapered portion 51*a* and the columnar portion 51*b*, respectively. Since the curved surface portion 51*c* is formed of the arc in the section, the punch 51 can be prepared easily.

Figure 8A:
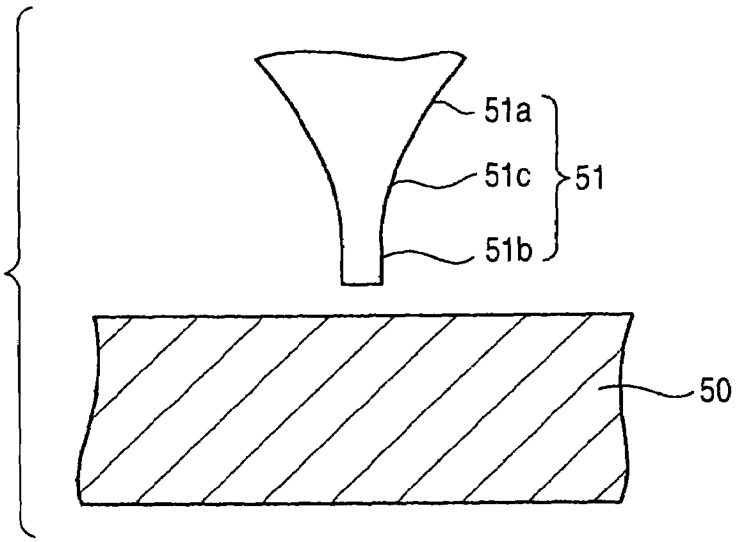
FIG. 8 is a diagram illustrating steps of producing a nozzle plate.
Figure 8B:
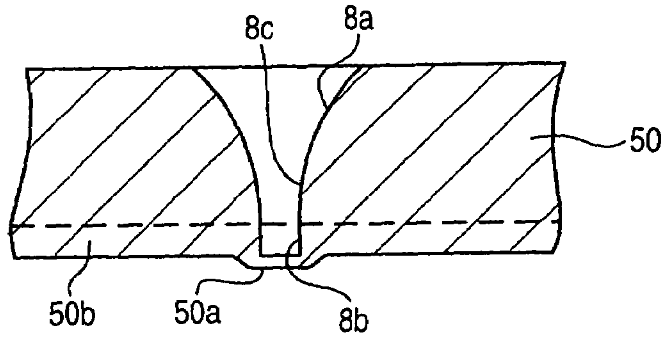

As shown in FIG. 8A, the punch 51 is driven against the rear face (on the side of the pressure chamber 10) of the substrate 50 with a stroke by which the substrate 50 is not pierced, whereby, as shown in FIG. 8B, a tapered hole portion 8*a*, a columnar hole portion 8*b*, and a curved-surface hole portion 8*c* which interconnects the tapered hole portion 8*a* and the columnar hole portion 8*b* are formed in the substrate 50. The tapered hole portion 8*a*, the columnar hole portion 8*b*, and the curved-surface hole portion 8*c* correspond to the tapered portion 51*a*, the columnar portion 51*b*, and the curved surface portion 51*c* of the punch 51, respectively. As shown in FIG. 9, the tangential line of the curved-surface hole portion 8*c* at a connection end D is parallel to a straight line forming the columnar hole portion 8*b*. Hence, the connection end D is not an inflection point, so that the inner diameter of the nozzle hole 8 in the vicinity of the connection end D is less changed. Also the tangential line of the curved-surface hole portion 8*c* at a connection end E is parallel to a straight line forming the tapered hole portion 8*a*. Hence, also the connection end E is not an inflection point, so that the inner diameter in the interface between the curved-surface hole portion 8*c* and the tapered hole portion 8*a* is not abruptly changed.

Furthermore, an example of the shape of the curved-surface hole portion 8*c* will be described. In the section containing the axis C1 of the punch 51, it is assumed that a coordination system has: an X axis passing the connection end between the curved surface portion 51*c* and the columnar portion 51*b* and being perpendicular to the axis C1; a Y axis being parallel to the axis C1 and increasing toward the tapered portion 51*a*; and an origin at the center of the arc forming the curved surface portion 51*c*. Also, it is assumed that the taper angle of the tapered portion 51*a* is θ as shown in FIG. 7 and the Y-coordinate of an intersection between the two tangential lines at the ends or the curved surface portion 51*c* is L. The arc is expressed by the following formula.

$$x^2 + y^2 = \left(\frac{L}{\tan\frac{\theta}{2}}\right)^2$$

Figure 9A:
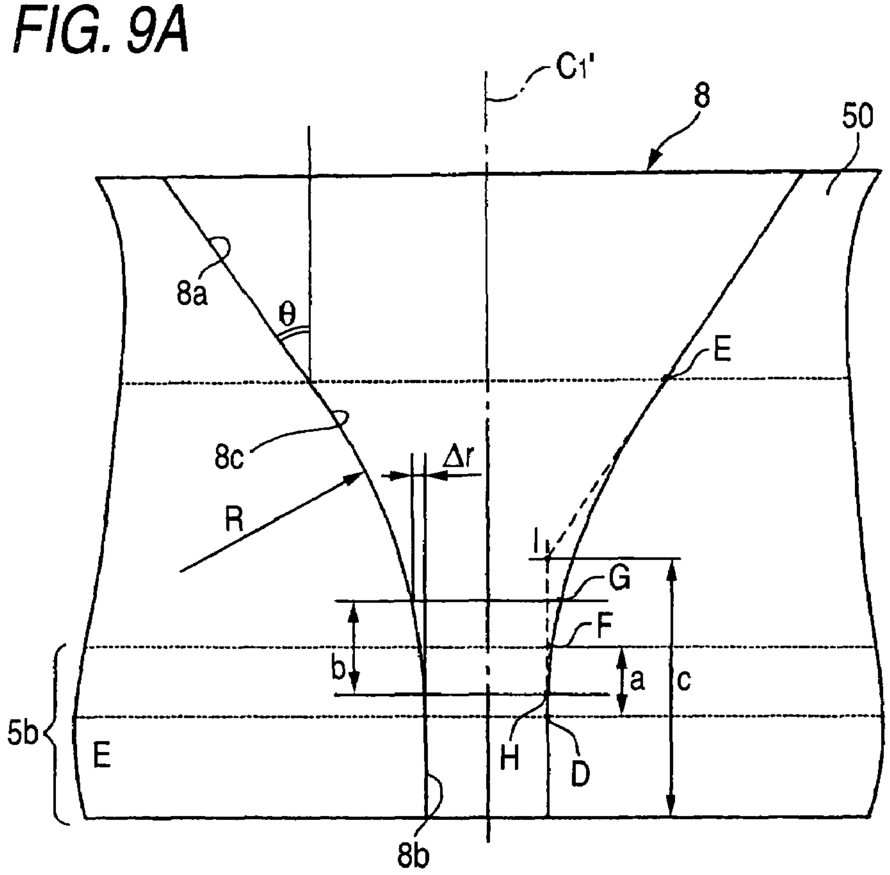
FIG. 9A is an enlarged view of the nozzle plate showing a nozzle hole.
Figure 9B:
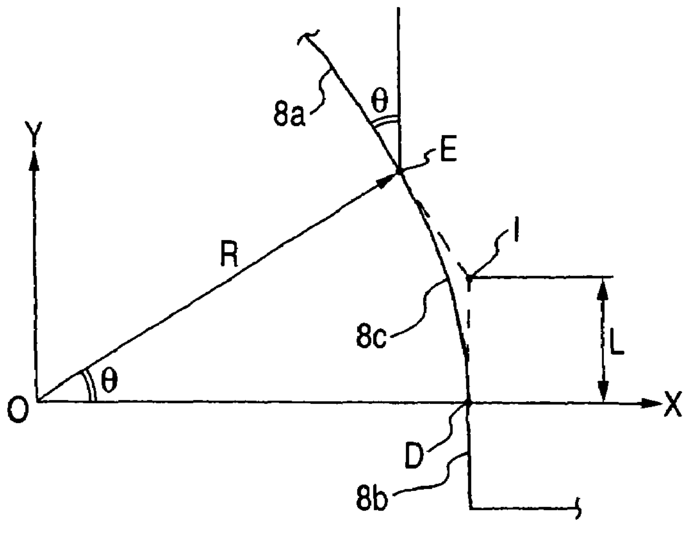
FIG. 9B is an enlarged view of a curved-surface hole portion in FIG. 9A.

In other words, as shown in FIGS. 9A and 9B, the curved-surface hole portion 8*c*, which is formed in the substrate 50 in accordance with the curved surface portion 51*c*, includes an arcuate curve in a section containing a center line C1' passing a cross-sectional center of the nozzle hole 8. In the section containing the center line C1', it is assumed that a coordinate system has: an X axis passing the connection end D between the curved-surface hole portion 8*c* and the columnar hole portion 8*b* and being perpendicular to the center line C1'; a Y axis being parallel to the center line C1' and increasing toward the tapered hole portion 8*a*; and an origin at the center of the arc. It is also assumed that the taper angle of the tapered hole portion 8*a* is θ and that the Y-coordinate of an intersection I between the two tangential lines at the ends of the curved-surface hole portion 8*c* is L. The arc is expressed by the following formula.

$$x^2 + y^2 = \left(\frac{L}{\tan\frac{\theta}{2}}\right)^2$$

Figure 8C:
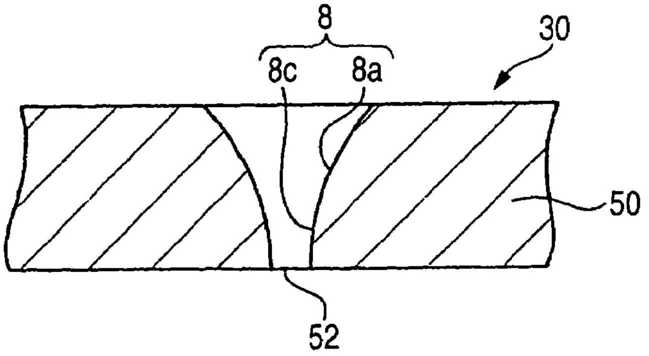

When the punch 51 is driven against the rear face of the substrate 50, as shown in FIG. 8B, a protrusion 50*a* is inevitably formed on the surface of the substrate 50. As shown in FIG. 8C, therefore, the protrusion 50*a* is removed away by, for example, grinding using a grinding machine, so that the surface of the substrate 50 is flattened and an ink ejection port 52 is formed in the surface of the substrate 50. In the substrate 50, a surface portion 50*b* where at least the columnar hole portion 8*b* is formed is simultaneously removed away. Therefore, the whole columnar hole portion 8*b* is thoroughly removed away, and also the vicinity of the connection end D between the curved-surface hole portion 8*c* and the columnar hole portion 8*b* is removed away, whereby the inner diameter of the nozzle hole 8 is gradually changed as advancing from the ink ejection port 52 formed in the surface (nozzle surface) of in the substrate 50 to the curved-surface hole portion 8*c* having an arcuate section shape is a results the ink impact accuracy is improved. In the work of removing the surface portion 50*b*, it is requested to remove the whole columnar hole portion 8*b*, and also a part of the curved-surface hole portion 8*c* may be removed away together with the columnar hole portion 8*b*.

Figure 10:
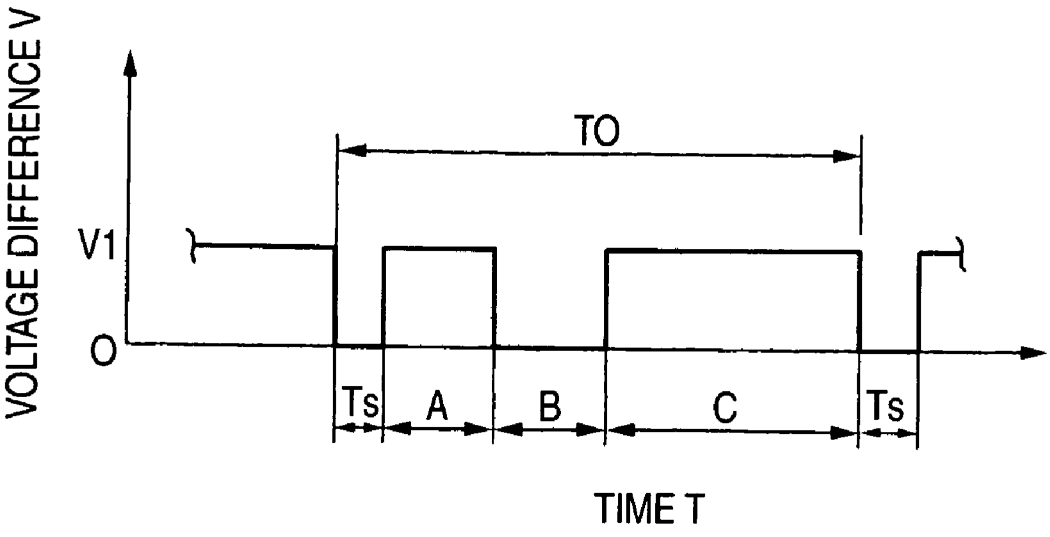
FIG. 10 is a diagram illustrating a pulse signal supplied to the actuator unit.
Figure 18:
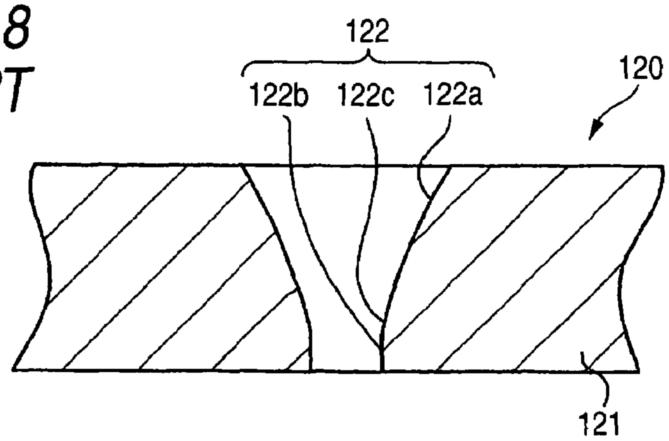
FIG. 18 PRIOR ART
FIG. 18 is a section view of a conventional nozzle plate having a nozzle hole formed by a tapered hole portion, a columnar hole portion, and a curved-surface hole portion.

The ink impact accuracy in the case where an ink was ejected from the nozzle hole 8 shown in FIG. 9 was compared and studied with that of the nozzle plate shown in FIG. 18 disclosed in U.S. Pat. No. 6,170,934. FIG. 10 shows a pulse signal which was supplied from the driver IC 80 (see FIG. 2) to the actuator unit 21 (see FIG. 6) when an ink was to be ejected. In the state where no potential difference was produced between the individual electrode 35 and the common electrode 34 in the actuator unit 21, the piezoelectric sheets 41 to 44 positioned above the pressure chamber 10 were not deformed. By contrast, when a potential difference V1 was applied between the individual electrode 35 and the common electrode 34, the piezoelectric sheets 41 to 44 were deformed toward the pressure chamber 10 to reduce the capacity of the S pressure chamber 10, whereby the capacity of the pressure chamber 10 was reduced to raise the pressure in the pressure chamber 10.

When an ink was to be ejected, first, a pulse for lowering the pressure in the pressure chamber 10 was applied in the waiting state where the piezoelectric sheets 41 to 44 (see FIG. 6) were deformed and the capacity of the pressure chamber 10 was reduced. Namely, the potential difference V between the individual electrode 35 and the common electrode 34 was set to 0, whereby the deformation of the piezoelectric sheets 41 to 44 was cancelled and the capacity of the pressure chamber 10 was once increased. This caused the pressure chamber 10 to be refilled with an ink in the sub-manifold 5*a*. After an elapse of a predetermined time period Ts (in this study, Ts=6.0 μs), a pulse for raising the pressure in the pressure chamber 10 was applied to set the potential difference V to V1, and the pressure wave propagating through the individual ink flow path 32 (see FIG. 5) was adequately amplified to eject the ink from the nozzle hole 8. In order to suppress the pressure wave propagating in the individual ink flow path 32, thereafter, the state where the capacity of the pressure chamber 10 was reduced is maintained for a predetermined time period A. Although the volume of an ink droplet ejected from the nozzle hole 8 was reduced when the predetermined time period A was short, this study of the ink impact accuracy was conducted while setting the predetermined time period A to a range where the volume of an ink droplet was not reduced. Thereafter, a pulse for lowering the pressure in the pressure chamber 10 was applied, and, after an elapse of a predetermined time period B, a pulse for raising the pressure in the pressure chamber 10 was again applied to eliminate the pressure wave in the individual ink flow path 32. Under this state, the actuator unit was kept to a waiting state for a predetermined time period C. The total time period T0 (=Ts+A+B+C) required for conducting one ink ejection was previously determined to be a given value (in this study, T0=60 μs).

The property of ink ejection from the nozzle hole 8 depends on the values of Ts, A, B, and C. The optimum value of To is determined by the length of the propagation time (acoustic length: AL length), which depends on the shape of the individual ink flow path 2, and the property of the ink. By contrast, the optimum values of A, B, and C are determined in the design phase so as to obtain an excellent ink impact accuracy. However, factors such as a production error of the individual ink flow path 32, which are produced in production steps, may cause the values determined in the design phase to be shifted from optimum ones, whereby the ink impact accuracy is lowered. In other words, as the ranges of the values of A, B, and C where the ink impact accuracy is ensured to a satisfactory level are wider, the ink impact accuracy is higher. In the study described below, the temperature conditions were set to room temperature (about 27 to 28° C.), and used inks were inks of black (viscosity: 3 to 5 mPa·s) and cyan (viscosity: 3 to 5 mPa·s).

Figure 11A:
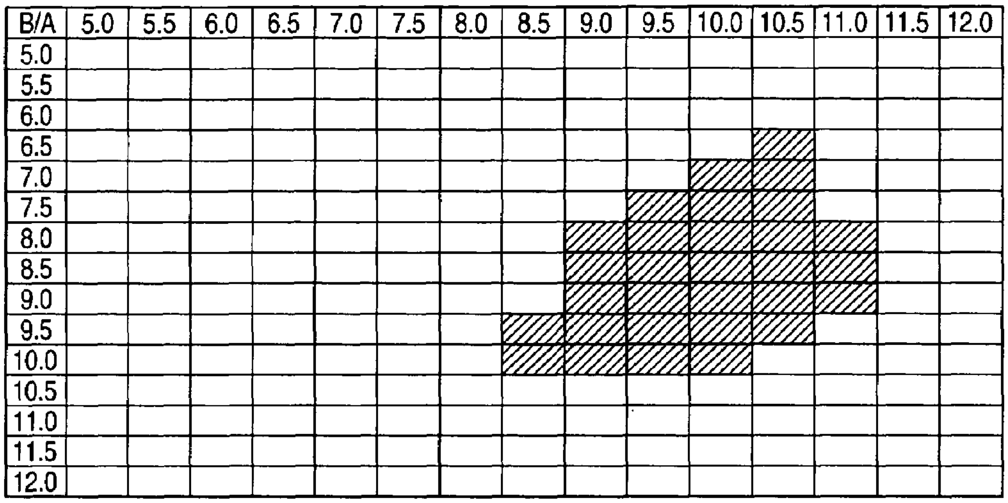
FIG. 11A is a view showing results of a study of the ink impact accuracy (in the nozzle plate of the embodiment) in the case where the ink is black.
Figure 11B:
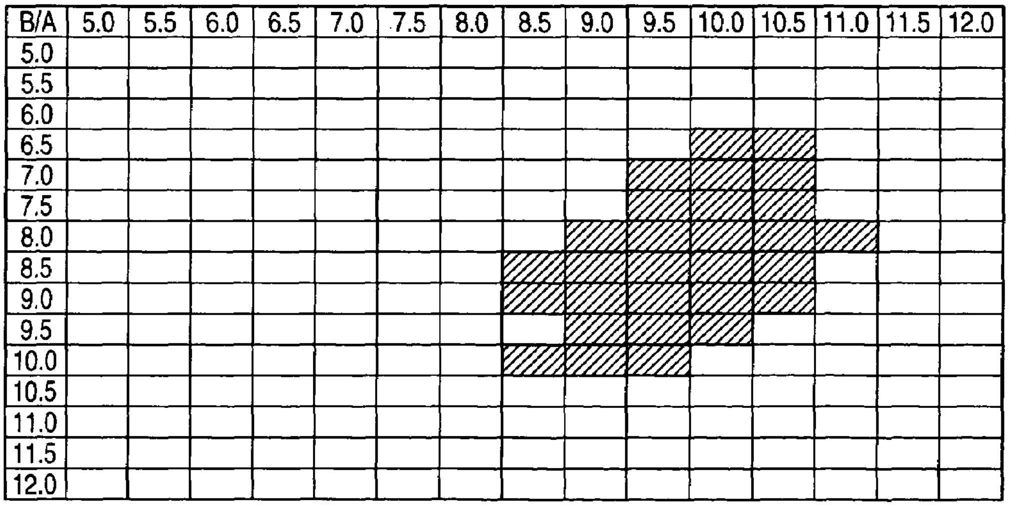
FIG. 11B is a view showing results in the case where the ink is cyan.

In the study, therefore, the ink impact accuracy of the nozzle plate 30 of the embodiment shown in FIG. 9 was compared with that of the nozzle plate of FIG. 18, based on the manner how the ink impact accuracy was varied when the values of A and B were changed. FIGS. 11 and 12 show results, which were obtained when the values of A and B were changed in a range from 5.0 μs to 12.0 μs. FIG. 11A shows ranges where the nozzle plate 30 of the embodiment exhibited an excellent ink impact accuracy in the case where the ink was black. FIG. 11B shows those in the case where the ink was cyan. FIG. 12A shows ranges where the nozzle plate of FIG. 18 exhibited an excellent ink impact accuracy in the case where the ink was black. FIG. 12B shows those in the case where the ink was cyan. In FIGS. 11 and 12, the filled portions are those where the ink impact accuracy was judged excellent. The ink impact accuracy was judged excellent or not by visually checking whether, in a result of printing a test pattern by continuously ejecting an ink from the same nozzle hole 8, the ink was ejected in a sprayed manner or not, or the ink impact position was deviated or not.

As shown in FIGS. 11 and 12, in both the cases where inks of black and cyan were used, the range of portions where the ink impact property was judged excellent in the nozzle plate 30 of the embodiment of FIG. 9 is considerably wider than that in the nozzle plate of FIG. 18. That is, with respect to the pulse signal supplied to the actuator unit 21, the range where the pulse width of the signal is settable is wider than that in the nozzle plate of FIG. 18. Therefore, in the case where the nozzle plate 30 of the embodiment is used, even when the process tolerance of the individual ink flow path 32 in the process of producing the flow path unit 4 is somewhat relaxed, it is possible to ensure an excellent ink impact property.

In the case where an ink of black is used in the nozzle plate 30 of the embodiment, for example, the pulse signal supplied to the actuator unit 21 may be set so as to have values of A=10 μs and B=8.5 μs, which are substantially at the middle of the range shown in FIG. 11A where an excellent ink impact property is attained. Under this setting, even when the range where an excellent ink impact property is attained is slightly changed by a production error of the produced flow path unit 4, it is possible to keep the preset conditions of the pulse signal within the range where an excellent ink impact property is attained. Therefore, in the production of the flow path unit 4, a process tolerance, which is not so severe as that required in the related art, is requested, and the productivity can be improved. Moreover, even when not only the process tolerance but also the environmental conditions (the temperature, the humidity, and the like) are somewhat varied, an excellent ink impact accuracy can be similarly ensured.

Referring again to FIG. 9, in the vicinity of the connection end D between the curved-surface hole portion 8*c* and the columnar hole portion 8*b*, the inner diameter of the nozzle hole 8 is changed in a small degree. When the surface portion of the substrate 50 where the columnar hole portion 8*b* is formed is removed away, the ejection port 52 is formed in the surface of the substrate 50 while roving away the vicinity of the connection end D. Even when the removal amount (the removed thickness) of the surface portion is varied due to a working error in this process and also a part of the curved-surface hole portion 8*c* is removed away, variation of the diameter of the ink ejection port 52 (see FIG. 8C) is very small.

The degree of variation of the diameter of the ink ejection port 52 is studied in the following manner. In FIG. 9, it is assumed that the taper angle of the tapered hole portion 8*a* is θ; that the radius of curvature of the curved-surface hole portion 8*c* is R; that a is the distance between the connection end D and a working target position F of the nozzle surface in which the ink ejection port 52 is to be formed, and which is set to be on the side of the curved-surface hole portion 8*c* with respect to the connection end D; that a working error is b; and that the maximum variable positions of the nozzle surface, which are separated from the working target position F by b/2, are G and H. Furthermore, it is also assumed that c is the distance between an intersection I between tangential lines at the connection ends D and E of the curved-surface hole portion 8*c*, and the tip end of the columnar hole portion 8*b*. The value of c corresponds to the length of virtual columnar hole portion 8*b* in an assumed case where the nozzle hole 8 is approximately configured only by the tapered hole portion 8*a* and the columnar hole portion 8*b*. It is assumed that, when the surface portion 50*b* of the substrate 50 is removed away, the removal amount is varied due to a working error and the actual position of the ink ejection port 52 is deviated from the working target position F. Studied in the following manner is the difference ΔD (=2×Δr) between the diameter in the case where the ink ejection port 52 is formed in the position H, which is nearest to the surface, and that in the case where the ink ejection port 52 is formed in the position G, which is nearest to the rear face.

(1) Comparison with the Nozzle Hole 8 (see FIG. 16) Having a Tapered Shape without the Curved-Surface Hole Portion 8*c*

Figure 16:
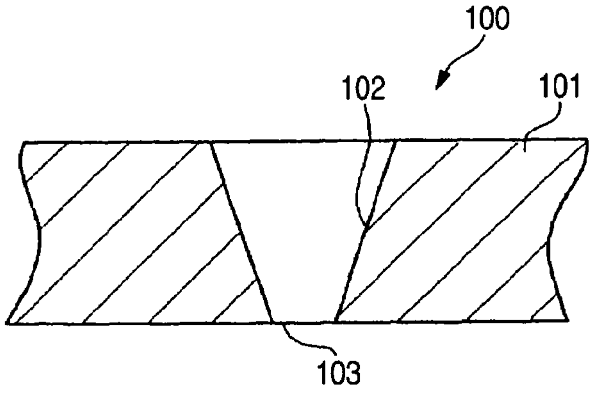
FIG. 16 PRIOR ART
FIG. 16 is a section view of a conventional nozzle plate having a nozzle hole of a tapered shape.
Figure 17:
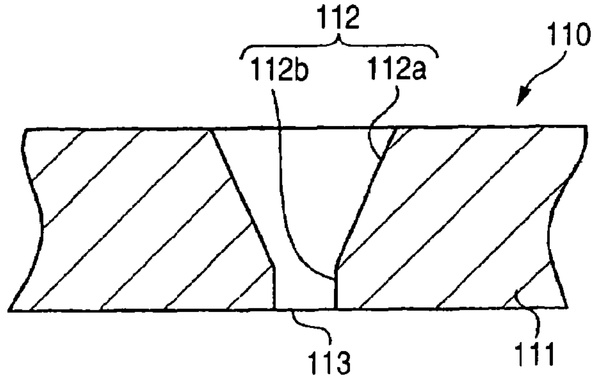
FIG. 17 PRIOR ART
FIG. 17 is a section view of a conventional nozzle plate having a nozzle hole formed by a tapered hole portion and a columnar hole portion.

The above-mentioned parameters are set to the following specific values, and the values of ΔD of the nozzle hole 8 in the embodiment is compared with that of the nozzle hole having a tapered shape shown in FIG. 16.

In the nozzle hole 8 of FIG. 9, when the thickness of the substrate 50 is 75 μm, θ=8.35 degrees, R=137.154 μm, a=3 μm, b=4 μm, and c=10 μm, the diameter difference of the ink ejection port 52 between the positions G and H is ΔD=0.175 μm. This value is considerably smaller than an allowable value (about 1.0 μm), which is obtained by incorporating a safety margin into the drawing tolerance. By contrast, when the same conditions (θ=8.35 degrees, a=3 μm, and b=4 μm) are imposed on the conventional nozzle shown in FIG. 16, ΔD=1.173 μm. Namely, it is seen that, according to the nozzle hole 8 of the embodiment, the diameter of the ink ejection port 52 is varied in a very smaller degree with respect to the working error b (⅙ or less under the above-mentioned conditions) as compared with the nozzle hole having a tapered shape shown in FIG. 16.

In (2) to (5) below, relationships between the values of θ, a, b, and c, and ΔD will be discussed.

(2) Relationships between the Taper Angle θ and ΔD

Figure 13A:
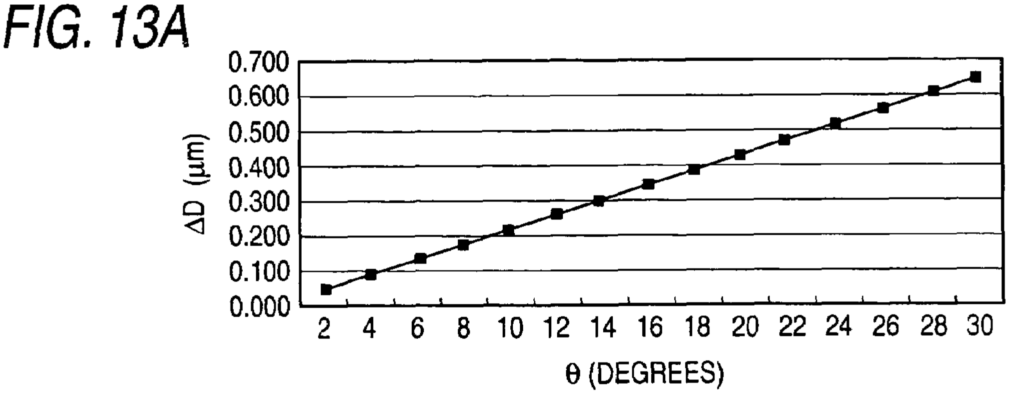
FIG. 13A is a view showing relationships of θ and ΔD in results of a study of variation of the diameter of an ink ejection port.

FIG. 13A shows the diameter difference ΔD of the ink ejection port between the positions G and H in the case where the values of a, b, and c are set to the same values as those in (1) and the taper angle θ is changed. As seen from FIG. 13A, as the value of θ is larger, the curvature radius R of the curved-surface hole portion 8*c* is smaller, and hence ΔD inevitably becomes larger. In the range where θ is 2 to 30 degrees, however, ΔD is sufficiently smaller than the allowable value (about 1.0 μm which is obtained by incorporating a safety margin into the drawing tolerance.

(3) Relationships between the distance a from the connection end D to the working target position F and ΔD.

Figure 13B:
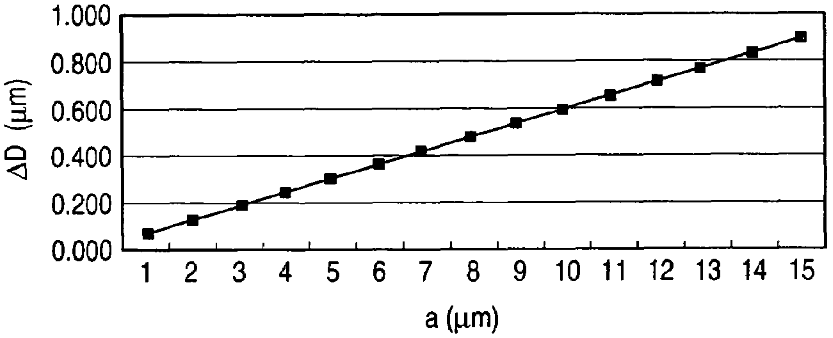
FIG. 13B is a view showing relationships of a and ΔD.

FIG. 13B shows the diameter difference ΔD of the ink ejection port 52 between the positions G and B in the case where the values of θ, b, and c are set to the same values as those in (1) and the distance a from the connection end D to the working target position F is changed. As seen from FIG. 13B, as the value of a is larger, the rate of change of the inner diameter of the nozzle hole 8 becomes larger, and hence ΔD becomes larger. In the range where a takes 1 to 15 μm, however, ΔD is sufficiently smaller than the allowable value (about 1.0 μm), which is obtained by incorporating a safety margin into the drawing tolerance.

(4) Relationships between the Working Error b and ΔD

Figure 13C:
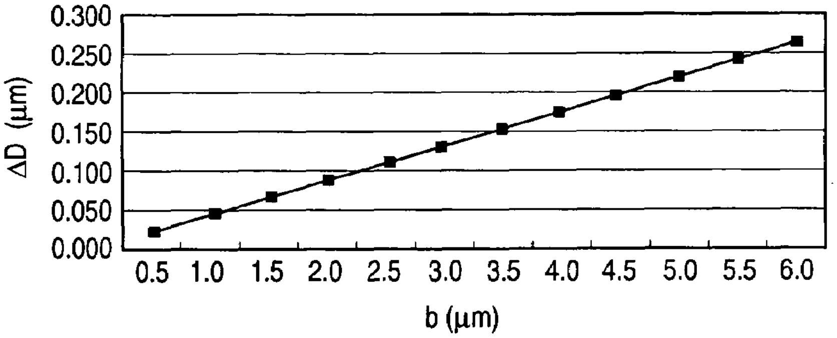
FIG. 13C is a view showing relationships of b and ΔD.

FIG. 13C shows the diameter difference ΔD of the ink ejection port 52 between the positions G and H in the case where the values of θ, a, and c are set to the same values as those in (1) and the working error b is changed. As seen from FIG. 13C, as the working error b is larger, ΔD naturally becomes larger. In the range where b takes 0.5 to 6.0 μm, however, ΔD is considerably smaller than the allowable value (about 1.0 μm), which is obtained by incorporating a safety margin into the drawing tolerance.

(5) Relationships between the Distance c and ΔD.

Figure 13D:
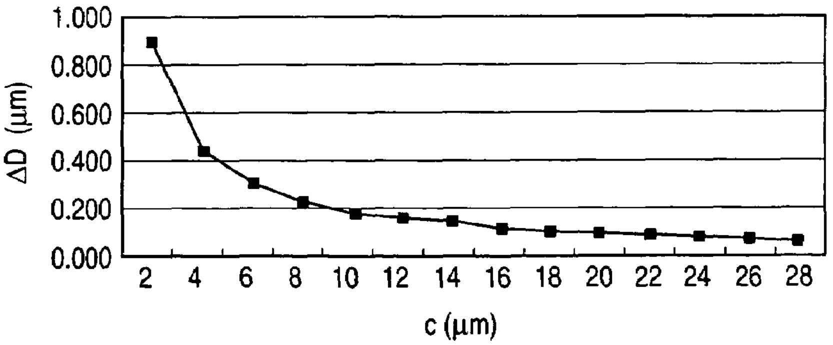
FIG. 13D is a view showing relationships of c and ΔD.

As described above, the distance c is equal to the length of the virtual columnar hole portion 8*b*. In other words, the distance c has a one-to-one relationship with the length of the arc of the curved-surface hole portion 8*c*. FIG. 13D shows the diameter difference ΔD of the ink ejection port 52 between the positions G and H in the case where the values of θ, a, and b are set to the same values as those in (1) and the distance c is changed. As seen from FIG. 13D, in the range where c takes 2 to 28 μm, ΔD is considerably smaller than the allowable value (about 1.0 μm), which is obtained by incorporating a safety margin into the drawing tolerance. In the case where the value of c is considerably small, however, the arc of the curved-surface hole portion 8*c* is correspondingly short, and hence the inner diameter of the curved-surface hole portion 8*c* is changed in a relatively large degree. In the case where c is shorter than 8 μm, particularly, the value of ΔD is abruptly increased although the value is smaller than the above-mentioned allowable value. By contrast, in the case where c is large, the value of ΔD is considerably small. In this respect, therefore, this case is preferable. However, a large value of c means that the curved-surface hole portion 8*c* is long. In the case where the value of c is larger than 16 μm, particularly, the inner diameter of the nozzle hole 8 is changed in a considerably small degree. In this case, the flow resistance of an ink in the nozzle hole 8 becomes too small, so that the property of ink ejection is susceptible to the influence of the flow resistance of the individual ink flow path 32 (see FIG. 6) which is upstream of the nozzle hole 8. Namely, there is the possibility that the property of ink ejection is changed by a production error of the individual ink flow path 32. Therefore, the value of c is Preferably in the range of 8 to 16 μm.

In the nozzle plate 30 of the embodiment, as described above, the ink ejection port 52 is formed by removing away even the vicinity of the connection end D between the curved-surface hole portion 8*c* and the columnar hole portion 8*b*. In the vicinity of the connection end D, the inner diameter of the nozzle hole 8 is changed in a small degree. Therefore, even when the removal amount (the removed thickness) of the surface portion is varied due to a working error, the variation (ΔD) of the diameter of the ink ejection port 52 can be suppressed to a low degree.

In the above-discussed study, the maximum variable position H of the nozzle surface, which is separated toward the connection end D from the working target position F by b/2 is positioned on the curved-surface hole portion 8*c* separated from the connection end D, and a part of the curved-surface hole portion 8*c* is always removed away. However, the setting of the working target position F is not restricted to this. Alternatively, the working target position F may be set so that at least the whole surface portion 50*b* is removed away, that is, for example, the maximum variable position H may coincide with the connection end D.

Next, modifications in which the embodiment described above in variously modified will be described. The components which are configured in the same manner as those of the embodiment are denoted by the same reference numerals, and their description is often omitted.

1] In the embodiment, in the process of forming the nozzle hole 8 in the substrate 50, the punch 51 does not pierce the substrate 50 (see FIG. 8). Alternatively, the punch 51 may pierce the substrate 50. In the alternative, when the substrate 50 is pierced by the punch 51, burrs are usually formed on the surface of the substrate 50. Therefore, at the same time when the burrs are removed away, the surface portion of the substrate 50 where at least the columnar hole portion 8*b* is formed may be removed away.

Figure 14:
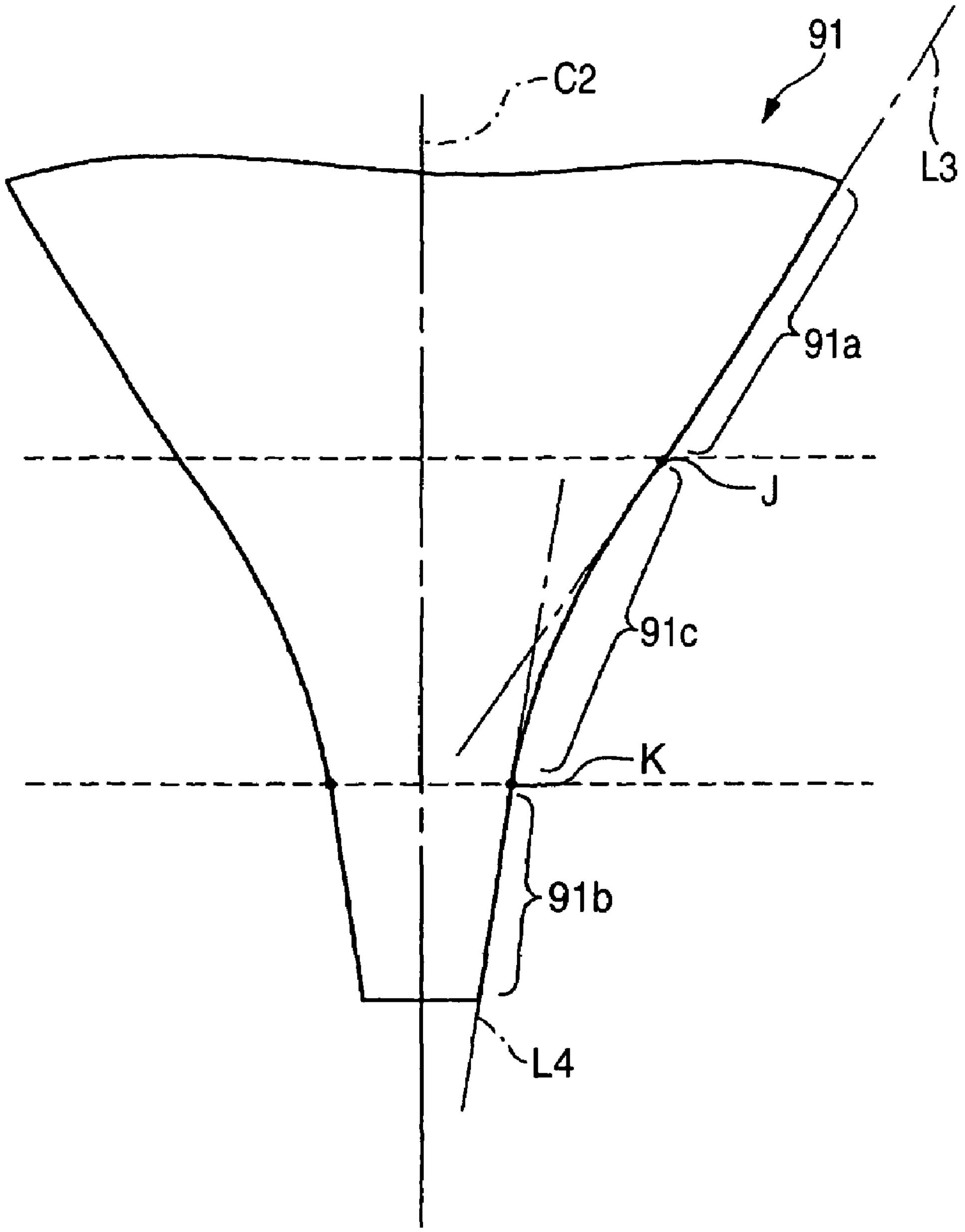
FIG. 14 is an enlarged view of a tip end portion of a punch in a modification.
Figure 15A:
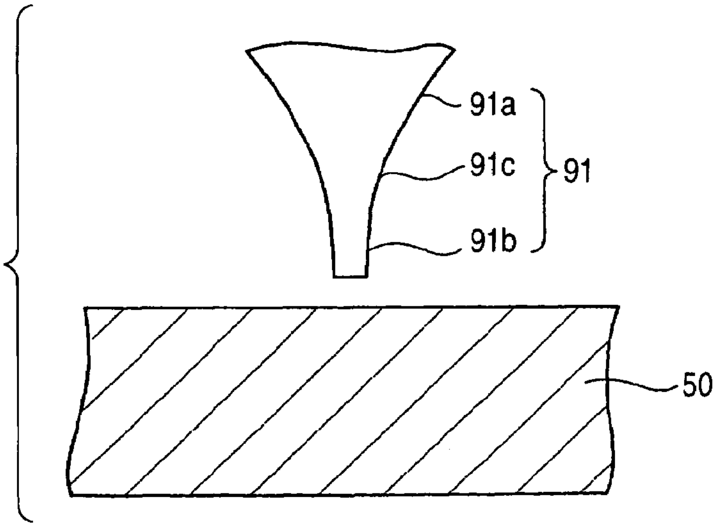
FIG. 15 is a diagram illustrating steps of producing a nozzle plate of the modification.

2] As shown in FIGS. 14 and 15, a nozzle hole 98 may be formed in the substrate 50 with using a punch 91 having: a first tapered portion 91*a* which, has a truncated conical shape and is formed on the basal side; a second tapered portion 91*b*, which is formed on the tip end side, has a truncated conical shape in a same manner as the first tapered portion 91*a*, and is smaller in diameter than the first tapered portion 91*a*; and a curved surface portion 91*c* which interconnects the first and second tapered portions 91*a* and 91*b*. In a section containing the axis C2 of the punch 91, the curved surface portion 91*c* is formed of an arc in which tangential lines L3, L4 at connection ends J, K between the curved surface portion 91*c* and the first, second tapered portions 91*a*, 91*b* are parallel to straight lines forming the first and second tapered portions 91*a* and 91*b*, respectively.

Figure 15B:
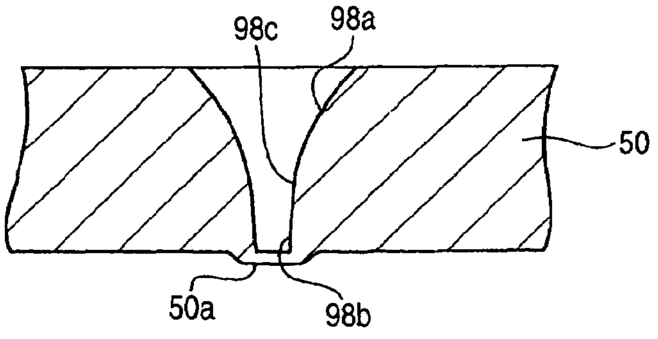

As shown in rig. 15A, the punch 91 is driven against the rear face of the substrate 50 with a stroke by which the substrate 50 is not pierced, whereby, as shown in FIG. 15B, a first tapered hole portion 98*a*; a second tapered hole portion 98*b*; and a curved-surface hole portion 98*c*, which interconnects the first and second tapered hole portions 98*a*and 98*b*, are formed in the substrate 50. The first tapered hole portion 98*a*, the second tapered hole portion 98*b*, and the curved-surface hole portion 98*c* correspond to the first tapered portion 91*a*, the second tapered portion 91*b*, and the curved surface portion 91*c*, respectively.

Figure 15C:
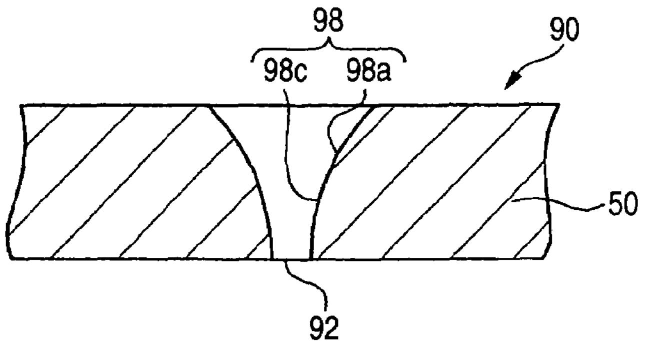

As shown in FIG. 15C, in the same manner as the embodiment, at the same time when the protrusion 50*a* formed on the surface of the substrate 50 is removed away, a surface portion of the substrate 50 where at least the second tapered hole portion 98*b* is formed is removed away to form the nozzle hole 98. In a nozzle plate 90 having the nozzle hole 98, in the same manner as in the nozzle plate 30 of the embodiment, the inner diameter of the nozzle hole 98 is gradually changed as advancing from an ink ejection port 92 to the curved-surface hole portion 98*c* having an arcuate section shape, and the ink impact accuracy is improved. As compared with the embodiment, the second tapered portion 91*b*, which is at the tip end of the punch 91, has a tapered shape, and hence the resistance exerted during the process of driving the punch 91 against the substrate 50 is so small to bring an advantage that the working efficiency is improved.

Figure 19:
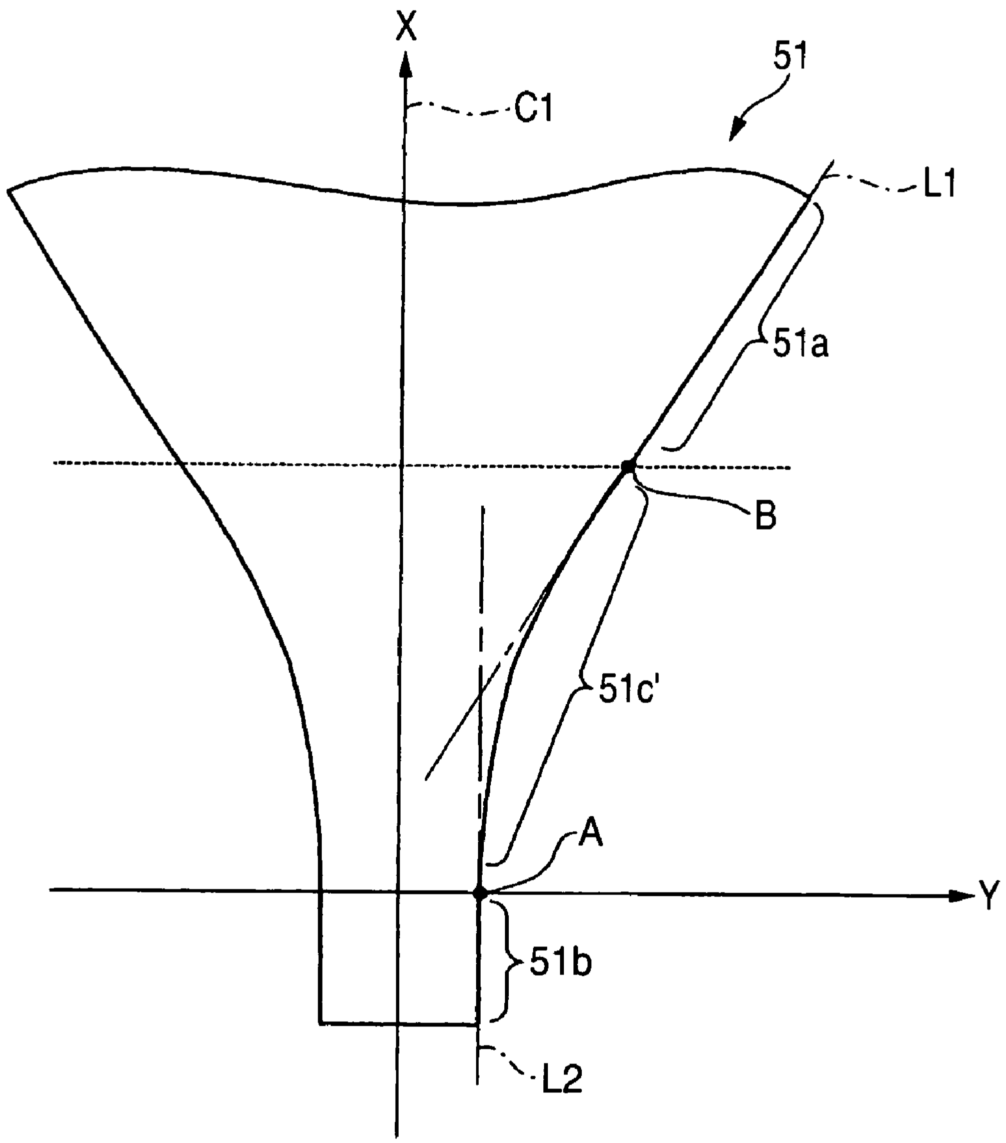
FIG. 19 shows an enlarged view of the tip end portion of the punch 51 of a modification example.

3] The shape of the curved line forming the curved surface portion 51*c* of the punch 51 is not restricted to the arcuate shape in the embodiment. FIGS. 19 shows an enlarged view of the tip end portion of the punch 51 of the modification example. In FIG. 19, it is assumed that a coordinate system has an X axis being parallel to the axis C1 and increasing toward the tapered portion 51*a*; and a Y axis passing the connection end A between the curved surface portion 51*c* ' and the columnar portion 51*b* and being perpendicular to the X axis. Here, it is necessary for the curved line forming the curved surface portion 51*c* ' to satisfy at least that the curved surface portion 51*c* ' is connected to the tapered portion 51*a* and the columnar portion 51*b* smoothly. Specifically, if a radius of the punch 51 at a coordinate X is expressed as Y and a line including the line forming the tapered portion 51*a*; the curved line forming the curved surface portion 51*c*'; and the line forming the columnar portion 51*b* is expressed by Y=F(X), it is at least required that F(X) is differentiable at the connection ends A and B in the section containing the axis C1. Furthermore, it is preferable that differential coefficients of F(X) between the connection ends A and B (that is, the curved line forming the curved portion 51*c*') have the same sign (positive or negative) in the section containing the axis C1. A preferred relational formula of X and Y depends on the taper angle θ, the radius of the columnar portion 51*b*, etc. An example of the relational formula will be shown. The curved line forming the curved surface portion 51*c*' in the section containing the axis C1 may be a curved line in which Y coordinate is expressed by an exponential function of X coordinate. When the taper angle θ=8.34 degrees and the radius of the columnar portion 51*b* is 12.5 μm, Y (μm) may be expressed by an exponential function of $Y=1.048^{X}+12.5$. When this punch is used, the followings are naturally obtained. Here, it is also assumed that in the substrate 50, a coordinate system has an X axis being parallel to the center line and increasing in the direction opposite to the ink ejecting direction; and a Y axis passing the connection end between the curved-surface hole portion and the columnar hole portion and being perpendicular to the X axis. In the curved-surface hole portion, which is formed in the substrate 50 in accordance with the curved surface portion 51*c* of the punch, the curved line forming the curved-surface hole portion in the section containing the center line is a curved line in which Y is expressed by an exponential function of X.

Alternatively, the curved line constituting the curved surface portion 51*c*' in the section containing the axis C1 of the punch 51 may be a curved line in which Y is expressed by an n-th order function of X (where n is an integer). A preferred example of the alternative will be shown. When the taper angle θ=8.34 degrees and the radius of the columnar portion is 12.5 μm, Y (μm) may be expressed by a quadratic function of $Y=0.0037X^2+12.5$. When this punch is used, the followings are obtained. In a curved-surface hole portion which is formed in the substrate in accordance with the curved surface portion 51*c*' of the punch 51 the curved line forming the curved-surface hole portion in the section containing the center line C1 is a curved line in which Y is expressed by a quadratic function of X.

Alternatively, the curved line constituting the curved surface portion 51*c*' in the section containing the axis C1 of the punch 51 may be a curved line in which Y is expressed by a trigonometric function of X. A preferred example of the alternative will be shown. When the taper angle θ=8.34 degrees and the radius of the columnar portion is 12.5 μm, Y (μm) may be expressed by a trigonometric function of $Y=25\cos\{(X-180)\times\pi/180\}+37.5$. When this punch is used, the followings are obtained. In a curved-surface hole portion, which is formed in the substrate 50 in accordance with the curved-surface portion 51*c*' of the punch 51, the curved line forming the curved-surface hole portion in the section containing the center line is a curved line in which Y is expressed by a trigonometric function of X.

What is claimed is:

1. A method for producing a nozzle plate, comprising:

pressing a substrate with using a metal mold part that includes:

a taper portion having a truncated-cone shape;

a truncated conical portion; and a curved-surface portion connecting the taper portion and the truncated conical portion, to form the substrate with a taper hole portion, a truncated conical hole portion, and a curved-surface hole portion connecting the taper hole portion and the truncated conical hole portion, which correspond to the taper portion, the truncated conical portion, and the curved-surface portion, respectively; and thereafter, removing a surface layer of the substrate, the surface layer including at least the truncated conical hole portion of the substrate, a portion of the substrate that surrounds the truncated conical hole portion, and a portion of the substrate that forms a bottom of the truncated conical hole portion.

2. The method according to claim 1, wherein:

in a section including a central axis of the metal molding part, the curved-surface portion is connected to the taper portion at a first position and to the truncated conical portion at a second position;

a tangential line of the curved-surface portion at the first position is parallel to a line forming the taper portion; and a tangential line of the curved-surface portion at the second position is parallel to a line forming the truncated conical portion.

3. The method according to claim 2, wherein in the section including the central axis of the metal molding part, a curve forming the curved-surface portion does not include an inflection point.

4. The method according to claim 2, wherein:

in the section including the central axis, a coordinate system has:

an x axis being parallel to the central axis and increasing toward the taper portion; and a y axis passing the second position and being perpendicular to the x axis;

when a y coordinate of a curve forming the curved-surface portion is expressed by a function of x, differential coefficients of the function between the first position and the second position have the same sign.

5. The method according to claim 2, wherein in the section including the central axis, a curve forming the curved-shape portion is an arc.

6. The method according to claim 5, wherein:

in the section including the central axis, a coordinate system has:

an x axis being identical passing the second position and being perpendicular to the central axis;

a y axis increasing toward the taper portion; and an origin being identical with a center of the arc; and the curve forming the curved-shape portion is expressed by:

$$x^2 + y^2 = \left(\frac{L}{\tan\frac{\theta}{2}}\right)^2$$

where θ represents an angle between the taper portion and the y axis; and L represents a y coordination of an intersection between the tangential lines of the curved-surface portion at the first position and the second position.

7. The method according to claim 1, wherein:

in the section including the central axis, a coordinate system has:

an x axis being parallel to the central axis and increasing toward the taper portion; and a y axis passing the second position and being perpendicular to the x axis; and in the section, a y coordinate of a curve forming the curved-surface portion is expressed by:

y=an exponential function of x.

8. The method according to claim 1, wherein:

in the section including the central axis, a coordinate system has:

an x axis being parallel to the central axis and increasing toward the taper portion; and a y axis passing the second position and being perpendicular to the x axis; and in the section, a y coordinate of a curve forming the curved-surface portion is expressed by:

y=an n-th order polynomial of x.

9. The method according to claim 1, wherein:

in the section including the central axis, a coordinate system has:

an x axis being parallel to the central axis and increasing toward the taper portion; and a y axis passing the second position and being perpendicular to the x axis; and in the section, a y coordinate of a curve forming the curved-surface portion is expressed by:

y=a trigonometric function of x.

10. The method according to claim 1, wherein the truncated conical portion of the metal mold part has a columnar shape.

11. The method according to claim 1, wherein removing the surface layer of the substrate comprises grinding the surface layer off the substrate.

12. The method according to claim 1, wherein the removing of the surface layer includes forming a nozzle hole in the remainder of the substrate, the nozzle hole having a dimension that gradually increases from a surface of the remainder of the substrate to an inner portion of the remainder of the substrate.

13. A method for producing a nozzle plate, comprising:

pressing a substrate with using a metal mold part, the metal mold part having a central axis, the metal mold part comprising:

a taper portion having a truncated-cone shape;

a truncated conical portion; and a curved-surface portion connecting the taper portion and the truncated conical portion, to form the substrate with a taper hole portion, a truncated conical hole portion, and a curved-surface hole portion connecting the taper hole portion and the truncated conical hole portion, which correspond to the taper portion, the truncated conical portion, and the curved-surface portion, respectively; and thereafter, removing a surface layer of the substrate, the surface layer including at least the truncated conical hole portion of the substrate and a portion of the substrate that surrounds the truncated conical hole portion, thereby forming a through hole having an x axis parallel to the central axis, wherein in a section including the central axis, a coordinate system has:

an x axis being parallel to the central axis and increasing toward the taper portion; and a y axis passing the second position and being perpendicular to the x axis, and in the section, a y coordinate of a curve forming the curved-surface portion is expressed by:

y=an exponential function of x.

* * * * *